United States Patent
Restrepo et al.

(10) Patent No.: US 8,373,570 B2
(45) Date of Patent: Feb. 12, 2013

(54) ARC FAULT DETECTION METHOD AND APPARATUS

(75) Inventors: Carlos Eduardo Restrepo, Atlanta, GA (US); Kallikuppa Muniyappa Sreenivasa, Karnataka (IN); Kantesh Vittal Agnihotri, Karnataka (IN); Manishkumar Natwarlal Shah, Karnataka (IN); Srikanth Soma, Karnataka (IN)

(73) Assignee: Cooper Technologies Company, Houston, TX (US)

( * ) Notice: Subject to any disclaimer, the term of this patent is extended or adjusted under 35 U.S.C. 154(b) by 288 days.

(21) Appl. No.: 12/912,711

(22) Filed: Oct. 26, 2010

(65) Prior Publication Data

US 2012/0098672 A1    Apr. 26, 2012

(51) Int. Cl.
    *G08B 21/00* (2006.01)

(52) U.S. Cl. ........ 340/657; 340/662; 340/664; 340/650; 340/815.45; 361/42

(58) Field of Classification Search .................. 340/635, 340/669, 650, 657, 662, 664, 815.45; 361/42, 361/44, 62, 93.1; 324/423, 424, 536
See application file for complete search history.

(56) References Cited

U.S. PATENT DOCUMENTS

| | | |
|---|---|---|
| 4,878,144 A | 10/1989 | Nebon |
| 5,223,795 A | 6/1993 | Blades |
| 5,432,455 A | 7/1995 | Blades |
| 5,434,509 A | 7/1995 | Blades |
| 5,452,223 A | 9/1995 | Zuercher et al. |
| 5,519,561 A | 5/1996 | Mrenna et al. |
| 5,627,716 A | 5/1997 | Lagree et al. |
| 5,729,145 A | 3/1998 | Blades |
| 5,963,406 A | 10/1999 | Neiger et al. |
| 6,088,205 A | 7/2000 | Neiger et al. |
| 6,097,580 A | 8/2000 | Zarelsky |
| 6,128,169 A | 10/2000 | Neiger et al. |
| 6,144,537 A | 11/2000 | Boteler |
| 6,246,556 B1 | 6/2001 | Haun et al. |
| 6,338,525 B1 | 1/2002 | Benz et al. |
| 6,407,893 B1 | 6/2002 | Neiger et al. |
| 6,433,978 B1 | 8/2002 | Neiger et al. |
| 6,504,692 B1 | 1/2003 | Macbeth et al. |

(Continued)

OTHER PUBLICATIONS

Shea, John J., "Glowing Contact Physics," Research Paper, Holm Conference Prize Paper Award, Sep. 25, 2006.

(Continued)

*Primary Examiner* — Anh V La
(74) *Attorney, Agent, or Firm* — King & Spalding LLP

(57) ABSTRACT

Load current from an electrical AC supply circuit is monitored so that both high frequency (10-100 kHz), and low frequency (60 Hz) signal current components are measured over certain time periods. A high frequency energy component is measured in an integral fashion, e.g., summing a plurality of samples taken. A certain amount of high frequency energy during a half-cycle is required to indicate an arc event. A certain number of these arc events per half-cycle must occur within a specific time period to indicate the presence of an arc. The root-mean-square (RMS) value of the low frequency energy component is used to determine the severity of the arc. The higher the amperage of the load current arc, the faster the arc fault circuit interrupter (AFCI) will respond by disconnecting the arcing load from the AC supply circuit, e.g., fewer number of arc events necessary for tripping of the AFCI.

16 Claims, 12 Drawing Sheets

U.S. PATENT DOCUMENTS

| | | |
|---|---|---|
| 6,577,484 B1 | 6/2003 | Macbeth et al. |
| 6,621,669 B1 | 9/2003 | Haun et al. |
| 6,639,769 B2 | 10/2003 | Neiger et al. |
| 6,807,035 B1 | 10/2004 | Baldwin et al. |
| 6,807,036 B2 | 10/2004 | Baldwin |
| 6,839,208 B2 | 1/2005 | Macbeth et al. |
| 6,972,572 B2 | 12/2005 | Mernyk et al. |
| 6,972,937 B1 | 12/2005 | Macbeth et al. |
| 7,003,435 B2 | 2/2006 | Kolker et al. |
| 7,068,480 B2 | 6/2006 | Wong et al. |
| 7,148,065 B2 | 12/2006 | Bohach |
| 7,151,656 B2 | 12/2006 | Dvorak et al. |
| 7,180,299 B2 | 2/2007 | Mernyk et al. |
| 7,187,526 B2 | 3/2007 | DiSalvo |
| 7,242,291 B2 * | 7/2007 | Nicolls et al. ............... 340/515 |
| 7,259,568 B2 | 8/2007 | Mernyk et al. |
| 7,333,920 B2 | 2/2008 | Kolker et al. |
| 7,463,465 B2 | 12/2008 | Rivers et al. |
| 7,535,234 B2 | 5/2009 | Mernyk et al. |
| 7,652,566 B2 * | 1/2010 | Lee et al. ..................... 340/515 |
| 8,184,011 B2 * | 5/2012 | Nayak et al. ................. 340/657 |
| 2009/0128264 A1 | 5/2009 | DiSalvo et al. |
| 2009/0207535 A1 | 8/2009 | Mernyk et al. |

OTHER PUBLICATIONS

Shea, John J., "Conditions for Series Arcing Phenomena in PVC Wiring," Research Paper, Oct. 17, 2005.

\* cited by examiner

ARC FAULT DETECTION METHOD AND APPARATUS

TECHNICAL FIELD

The present invention relates to arc fault interrupter circuits (AFCI), and more specifically, the invention relates to detecting series and parallel arc faults occurring in an electrical circuit.

BACKGROUND

Arcing is a luminous discharge of electricity across an insulating medium. An arc can cause a fire once the electrical energy from the arc becomes thermal energy. The heat generated by the thermal energy may then cause combustible material near the arc to ignite. Arcing occurs in wiring in two basic forms: parallel arcing and series arcing. Parallel arcing is an arc fault between two conductors, e.g., hot and neutral or hot and ground. An example of parallel arcing is when damage to the insulation of a power cable or cord between the hot and another (grounded or grounding) conductor allows an arc to jump across the damaged insulation between the hot and the other conductor. Series arcing is an arc established between the ends of a break (discontinuity) in a single conductor. Examples include loose terminations in a twist-on wire connector, loose device connections, and partially severed lamp cords, extension cords, etc. There is no data available about which type of arcing is more prevalent, nor where each type of arc is most likely to occur in a branch circuit. Therefore, a solution to preventing fires from arcs should address both series and parallel arcs that occur on branch wiring, plug-in power supply cords, etc.

There are multiple ways of detecting arc faults. Typically, the low frequency and the high frequency power spectrums of the load current are used in determining the presence of a series arc or parallel arc fault. Detection of zero crossings of the load current sine wave signal have been used to synchronize detection of the low and high frequency power spectrums in determining whether the measured load current is normal or from an arc fault. "Shoulders" are present at the zero current crossings during arcing conditions. Differential current measurement circuits, like those used in ground fault circuit interrupter (GFCI) protection circuits have been used to detect current imbalances that may be due to arc faults from a conductor to ground. AFCIs must be able to distinguish between normal arcing resulting from operation of a light switch or appliance motor, e.g., vacuum cleaner, but trip on detection of hazardous series arcs in a single conductor and/or parallel arc faults between conductors.

UL 1699 defines four relevant types of AFCIs as follows:
Arc-Fault Circuit Interrupter (AFCI)—A device intended to mitigate the effects of arcing faults by functioning to de-energize the circuit when an arc-fault is detected.
Branch/Feeder Arc-Fault Circuit Interrupter—A device intended to be installed at the origin of a branch/circuit or feeder, such as at a panel board. It is intended to provide protection of the branch/circuit wiring, feeder wiring, or both, against unwanted effects of arcing. This device also provides limited protection to branch circuit extension wiring. It may be a circuit-breaker type device or a device in its own enclosure mounted at or near a panel board.
Outlet Circuit Arc-Fault Circuit-Interrupter—A device intended to be installed at a branch circuit outlet, such as at an outlet box. It is intended to provide protection of cord sets and power-supply cords connected to it (when provided with receptacle outlets) against the unwanted effects of arcing. This device may provide feed-through protection of the cord sets and power-supply cords connected to downstream receptacles.
Combination Arc-Fault Circuit Interrupter—An AFCI which complies with the requirements for both Branch/Feeder and outlet circuit AFCIs. It is intended to protect downstream branch circuit wiring and cord sets and power-supply cords.

The NATIONAL ELECTRICAL CODE® (NEC®) (a registered trademark of the National Fire Protection Association, Inc., Corporation Massachusetts, One Batterymarch Park, P.O. Box 9101, Quincy, Mass. 02269-9101) first mandated the use of AFCIs in 1999 for the protection of branch circuits supplying bedroom receptacle outlets. The effective date of implementation was Jan. 1, 2002. During the past several years, millions of AFCI circuit breakers have been installed in the load centers of new construction houses to protect bedroom circuits. However, these installations still represent only a small fraction of all residential circuits. The AFCIs installed to date have been of the Branch/Feeder type, and their value has been recognized by many organizations including UL, CSA, NASFM and CPSC.

In 2005, section 210.12(B) of the NEC was changed to mandate the use of combination AFCIs for the protection of branch circuits supplying bedroom outlets, with the continued use of Branch/Feeder AFCIs being permitted only until Jan. 1, 2008. Both of these AFCI types mitigate the effects of high current arcs at any point in the branch circuit wiring and in the branch circuit extension wiring. Both of these AFCI types protect against low current arcs in the branch circuit wiring. The Combination AFCI also has the task of low-current arc-fault protection for cord sets and power-supply cords connected to outlets for example, but not limited to, receptacles and light fixtures.

In 2008, section 210.12(B) of the NEC was changed to expand the use of Combination AFCIs as follows: "(B) Dwelling Units. All 120-volt, single-phase, 15- and 20-ampere branch circuits supplying outlets installed in dwelling unit family rooms, dining rooms, living rooms, parlors, libraries, dens, bedrooms, sun rooms, recreation rooms, closets, hallways, or similar rooms or areas shall be protected by a listed arc-fault circuit interrupter, combination-type, installed to provide protection of the branch circuit."

SUMMARY

The aforementioned deficiencies and needs are addressed with an outlet branch circuit (OBC) AFCI that provides protection of the branch circuit and power supply cords connected thereto, and is intended for use in dwelling units, e.g., houses, apartments, hotel rooms, etc., as required by the NEC®. The OBC AFCI is intended to mitigate the effects of series arcing and parallel arcing faults that pose a risk of fire ignition under certain conditions if the arcing is allowed to persist. For example, the OBC AFCI may be used in an outlet having a maximum current rating of 20 amperes and intended for use in residential dwelling 120 VAC, 60 Hz, branch circuits (typical general purpose receptacles).

According to the teachings of this disclosure, load current is monitored so that both high frequency, e.g., 10-100 kHz, and low frequency, e.g., 60 Hz, current components are measured over certain time periods. The high frequency energy component is measured in an integral fashion, e.g., summing a plurality of samples taken. A certain amount of high frequency energy during a half-cycle is required to indicate an arc event. In addition, a certain number of these arc events per half-cycle must occur within a specific time period to indicate the presence of an arc. The root-mean-square (RMS) value of the low frequency energy component is used to determine the severity of the arc. The higher the amperage of the load current arc, the faster the AFCI will respond by disconnecting the load from the AC supply, e.g., fewer number of arc events necessary for tripping of the AFCI.

The arc will extinguish about the zero voltage crossings of the sinusoidal AC waveform and will restrike once there is sufficient voltage potential again between the different conductors (parallel arc fault) or between the severed ends of one conductor (series arc) to bridge the resistive (insulating) gap. When the arc restrikes once every half cycle or 120 times a second (e.g., 60 Hz power source), an amplitude modulated (AM) signal is generated over a broad frequency spectrum, e.g., 10-100 kHz. Therefore, 120 Hz modulated signal energy can be detected and quantified in the 10-100 kHz frequency range. The number of times arcing is detected over a certain period(s) in combination with the arc current drawn from the RMS supply at 60 Hz determines when the AFCI should disconnect the power source supply from the arcing load. For example, fewer arc events within the certain time period are required when the low frequency (60 Hz) current is at a higher current value, and more arc events within the certain time period(s) are required when the low frequency (60 Hz) current is at a lower current value.

According to a specific example embodiment of this disclosure, a method for determining when an arc fault occurs and thereafter disconnecting a supply voltage from the arc fault comprises the steps of: a) sampling a load current with a current sampling circuit to produce a sampled current signal; b) processing the sampled current signal to produce a low frequency current signal having frequency components less than about one kilohertz; c) processing the sampled current signal to produce a band pass frequency current signal having frequency components from about ten kilohertz to about one hundred kilohertz; d) calculating an energy value of the band pass frequency current signal; e) calculating a root-mean-square (RMS) current value of the low pass frequency current signal; f) determining whether the RMS current value of the low pass frequency current signal is greater than an RMS threshold value, wherein if not greater then returning to step a) and if greater then going to step g); g) determining whether the energy value of the band pass frequency current signal is greater than a high energy threshold value, wherein if not greater then returning to step f) and if greater then going to step h); h) assigning a score to an arc event; i) incrementing an arc event count in an arc event counter; j) starting an arc event time in an arc event timer; k) determining whether the arc event time is greater than a time threshold value, wherein if greater then resetting the arc event count and returning to step a) and if not greater then going to step l); l) determining whether the arc event count is greater than an arc event count threshold value, wherein if not greater then returning to step a) and if greater then going to step m); and m) generating a trip signal for disconnecting the supply voltage from the arc fault.

According to another specific example embodiment of this disclosure, a method for determining when an arc fault occurs and thereafter disconnecting a supply voltage from the arc fault comprises the steps of: a) sampling a load current with a current sampling circuit to produce a sampled current signal; b) processing the sampled current signal to produce a low frequency current signal having frequency components less than about one kilohertz; c) processing the sampled current signal to produce a band pass frequency current signal having frequency components from about ten kilohertz to about one hundred kilohertz; d) calculating an energy value of the band pass frequency current signal; e) calculating a root-mean-square (RMS) current value of the low pass frequency current signal; f) determining whether the RMS current value of the low pass frequency current signal is greater than an RMS threshold value, wherein if not greater then returning to step a) and if greater then going to step g); g) determining whether the energy value of the band pass frequency current signal is greater than a high energy threshold value, wherein if not greater then going to step h1) and if greater then going to step h); h) assigning a score to an arc event then going to step i); h1) determining whether the energy value of the band pass frequency current signal is less than a low energy threshold value, wherein if not less then returning to step a) and if less then going to step h2); h2) assigning a score to a non-arc event; i) incrementing an arc event count in an arc event counter; j) starting an arc event time in an arc event timer; k) determining whether the arc event time is greater than a time threshold value, wherein if greater then resetting the arc event and non-arc event counts and returning to step a) and if not greater then going to step l); l) determining whether a difference between the arc event count and the non-arc event count is greater than an arc event count threshold value, wherein if not greater then returning to step a) and if greater then going to step m); and m) generating a trip signal for disconnecting the supply voltage from the arc fault.

According to yet another specific example embodiment of this disclosure, a method for determining when an arc fault occurs and thereafter disconnecting a supply voltage from the arc fault comprises the steps of: a) sampling a load current with a current sampling circuit to produce a sampled current signal; b) processing the sampled current signal to produce a low frequency current signal having frequency components less than about one kilohertz; c) processing the sampled current signal to produce a band pass frequency current signal having frequency components from about ten kilohertz to about one hundred kilohertz; d) calculating an energy value of the band pass frequency current signal; e) calculating a root-mean-square (RMS) current value of the low pass frequency current signal; f) retrieving a high energy threshold value, a time threshold value and an arc event count threshold value from a look-up table based upon the RMS current value of the low pass frequency current signal; g) determining whether the energy value of the band pass frequency current signal is greater than the high energy threshold value, wherein if not greater then returning to step f) and if greater then going to step h); h) assigning a score to an arc event; i) incrementing an arc event count in an arc event counter; j) starting an arc event time in an arc event timer; k) determining whether the arc event time is greater than the time threshold value, wherein if greater then resetting the arc event count and returning to step a) and if not greater then going to step l); l) determining whether the arc event count is greater than the arc event count threshold value, wherein if not greater then returning to step a) and if greater then going to step m); and m) generating a trip signal for disconnecting the supply voltage from the arc fault.

According to still another specific example embodiment of this disclosure, a method for determining when an arc fault occurs and thereafter disconnecting a supply voltage from the arc fault comprises the steps of: a) sampling a load current with a current sampling circuit to produce a sampled current signal; b) processing the sampled current signal to produce a low frequency current signal having frequency components less than about one kilohertz; c) processing the sampled current signal to produce a band pass frequency current signal having frequency components from about ten kilohertz to about one hundred kilohertz; d) calculating an energy value of the band pass frequency current signal; e) calculating a rootmean-square (RMS) current value of the low pass frequency current signal; f) retrieving a high energy threshold value, a low energy threshold value, a time threshold value and an arc event count threshold value from a look-up table based upon the RMS current value of the low pass frequency current signal; g) determining whether the energy value of the band pass frequency current signal is greater than the high energy threshold value, wherein if not greater then going to step h1) and if greater then going to step h); h) assigning a score to an arc event then going to step i); h1) determining whether the energy value of the band pass frequency current signal is less than the low energy threshold value, wherein if not less then returning to step a) and if less then going to step h2); h2) assigning a score to a non-arc event; i) incrementing an arc event count in an arc event counter; j) starting an arc event time in an arc event timer; k) determining whether the arc event time is greater than the time threshold value, wherein if greater then resetting the arc event and non-arc event counts and returning to step a) and if not greater then going to step l); l) determining whether a difference between the arc event count and the non-arc event count is greater than the arc event count threshold value, wherein if not greater then returning to step a) and if greater then going to step m); and m) generating a trip signal for disconnecting the supply voltage from the arc fault.

According to still another specific example embodiment of this disclosure, a method for determining when an arc fault occurs and thereafter disconnecting a supply voltage from the arc fault comprises the steps of: a) sampling a load current with a current sampling circuit to produce a sampled current signal; b) processing the sampled current signal to produce a low frequency current signal having frequency components less than about one kilohertz; c) filtering the sampled current signal to produce a band pass frequency current signal having frequency components from about ten kilohertz to about one hundred kilohertz; d) calculating an energy value of the band pass frequency current signal; e) calculating a root-mean-square (RMS) current value of the low pass frequency current signal; f) determining whether the RMS current value of the low pass frequency current signal is greater than an RMS threshold value, wherein if not greater then returning to step a) and if greater then going to step g); g) determining whether the energy value of the band pass frequency current signal is greater than a high energy threshold value, wherein if not greater then going to step h1) and if greater then going to step h); h) assigning a score to an arc event then going to step i); h1) determining whether the energy value of the band pass frequency current signal is less than a low energy threshold value, wherein if not less then returning to step a) and if less then going to step h2); h2) assigning a score to a non-arc event; i) incrementing an arc event count in an arc event counter; j) starting an arc event time in an arc event timer; k) determining whether the arc event time is greater than a time threshold value, wherein if greater then resetting the arc event and non-arc event counts and returning to step a) and if not greater then going to step l); l) determining whether a ratio of the arc event count and the non-arc event count is greater than an arc event count threshold value, wherein if not greater then returning to step a) and if greater then going to step m); and m) generating a trip signal for disconnecting the supply voltage from the arc fault.

According to another specific example embodiment of this disclosure, a method for determining when an arc fault occurs and thereafter disconnecting a supply voltage from the arc fault comprises the steps of: a) sampling a load current with a current sampling circuit to produce a sampled current signal; b) processing the sampled current signal to produce a low frequency current signal having frequency components less than about one kilohertz; c) processing the sampled current signal to produce a band pass frequency current signal having frequency components from about ten kilohertz to about one hundred kilohertz; d) calculating an energy value of the band pass frequency current signal; e) calculating a root-mean-square (RMS) current value of the low pass frequency current signal; f) retrieving a high energy threshold value, a low energy threshold value, a time threshold value and an arc event count threshold value from a look-up table based upon the RMS current value of the low pass frequency current signal; g) determining whether the energy value of the band pass frequency current signal is greater than the high energy threshold value, wherein if not greater then going to step h1) and if greater then going to step h); h) assigning a score to an arc event then going to step i); h1) determining whether the energy value of the band pass frequency current signal is less than the low energy threshold value, wherein if not less then returning to step a) and if less then going to step h2); h2) assigning a score to a non-arc event; i) incrementing an arc event count in an arc event counter; j) starting an arc event time in an arc event timer; k) determining whether the arc event time is greater than the time threshold value, wherein if greater then resetting the arc event and non-arc event counts and returning to step a) and if not greater then going to step l); l) determining whether a ratio of the arc event count and the non-arc event count is greater than an arc event count threshold value, wherein if not greater then returning to step a) and if greater then going to step m); and m) generating a trip signal for disconnecting the supply voltage from the arc fault.

According to yet another specific example embodiment of this disclosure, a method for determining when an arc fault occurs and thereafter disconnecting a supply voltage from the arc fault comprises the steps of: a) sampling a load current with a current sampling circuit to produce a sampled current signal; b) processing the sampled current signal to produce a low frequency current signal having frequency components less than about one kilohertz; c) filtering the sampled current signal to produce a band pass frequency current signal having frequency components from about ten kilohertz to about one hundred kilohertz; d) calculating an energy value of the band pass frequency current signal; e) calculating a root-mean-square (RMS) current value of the low pass frequency current signal; f) determining whether the RMS current value of the low pass frequency current signal is greater than an RMS threshold value, wherein if not greater then returning to step a) and if greater then going to step g); g) determining whether the energy value of the band pass frequency current signal is greater than a high energy threshold value, wherein if not greater then going to step h1) and if greater then going to step h); h) assigning a score to an arc event then going to step i); h1) determining whether the energy value of the band pass frequency current signal is less than a low energy threshold value, wherein if not less then returning to step a) and if less then going to step h2); h2) assigning a score to a non-arc event; i) incrementing an arc event count in an arc event counter; j) starting an arc event time in an arc event timer; k) determining whether the arc event time is greater than a time threshold value, wherein if greater then resetting the arc event and non-arc event counts and returning to step a) and if not greater then going to step l); l) determining whether the arc event count is greater than an arc event count threshold value and the non-arc event count is greater than a non-arc event count threshold value, wherein if either is not greater then returning to step a) and if both are greater then going to step m); and m) generating a trip signal for disconnecting the supply voltage from the arc fault.

According to another specific example embodiment of this disclosure, a method for determining when an arc fault occurs and thereafter disconnecting a supply voltage from the arc fault comprises the steps of: a) sampling a load current with a current sampling circuit to produce a sampled current signal; b) processing the sampled current signal to produce a low frequency current signal having frequency components less than about one kilohertz; c) processing the sampled current signal to produce a band pass frequency current signal having frequency components from about ten kilohertz to about one hundred kilohertz; d) calculating an energy value of the band pass frequency current signal; e) calculating a root-mean-square (RMS) current value of the low pass frequency current signal; f) retrieving a high energy threshold value, a low energy threshold value, a time threshold value, an arc event count threshold value and a non-arc event count threshold value from a look-up table based upon the RMS current value of the low pass frequency current signal; g) determining whether the energy value of the band pass frequency current signal is greater than the high energy threshold value, wherein if not greater then going to step h1) and if greater then going to step h); h) assigning a score to an arc event then going to step i); h1) determining whether the energy value of the band pass frequency current signal is less than the low energy threshold value, wherein if not less then returning to step a) and if less then going to step h2); h2) assigning a score to a non-arc event; i) incrementing an arc event count in an arc event counter; j) starting an arc event time in an arc event timer; k) determining whether the arc event time is greater than the time threshold value, wherein if greater then resetting the arc event and non-arc event counts and returning to step a) and if not greater then going to step l); l) determining whether the arc event count is greater than the arc event count threshold value and the non-arc event count is greater than the non-arc event count threshold value, wherein if either is not greater then returning to step a) and if both are greater then going to step m); and m) generating a trip signal for disconnecting the supply voltage from the arc fault.

BRIEF DESCRIPTION OF THE DRAWINGS

For a more complete understanding of the present invention and the advantages thereof, reference is now made to the following description, in conjunction with the accompanying figures briefly described as follows.

Figure 1:
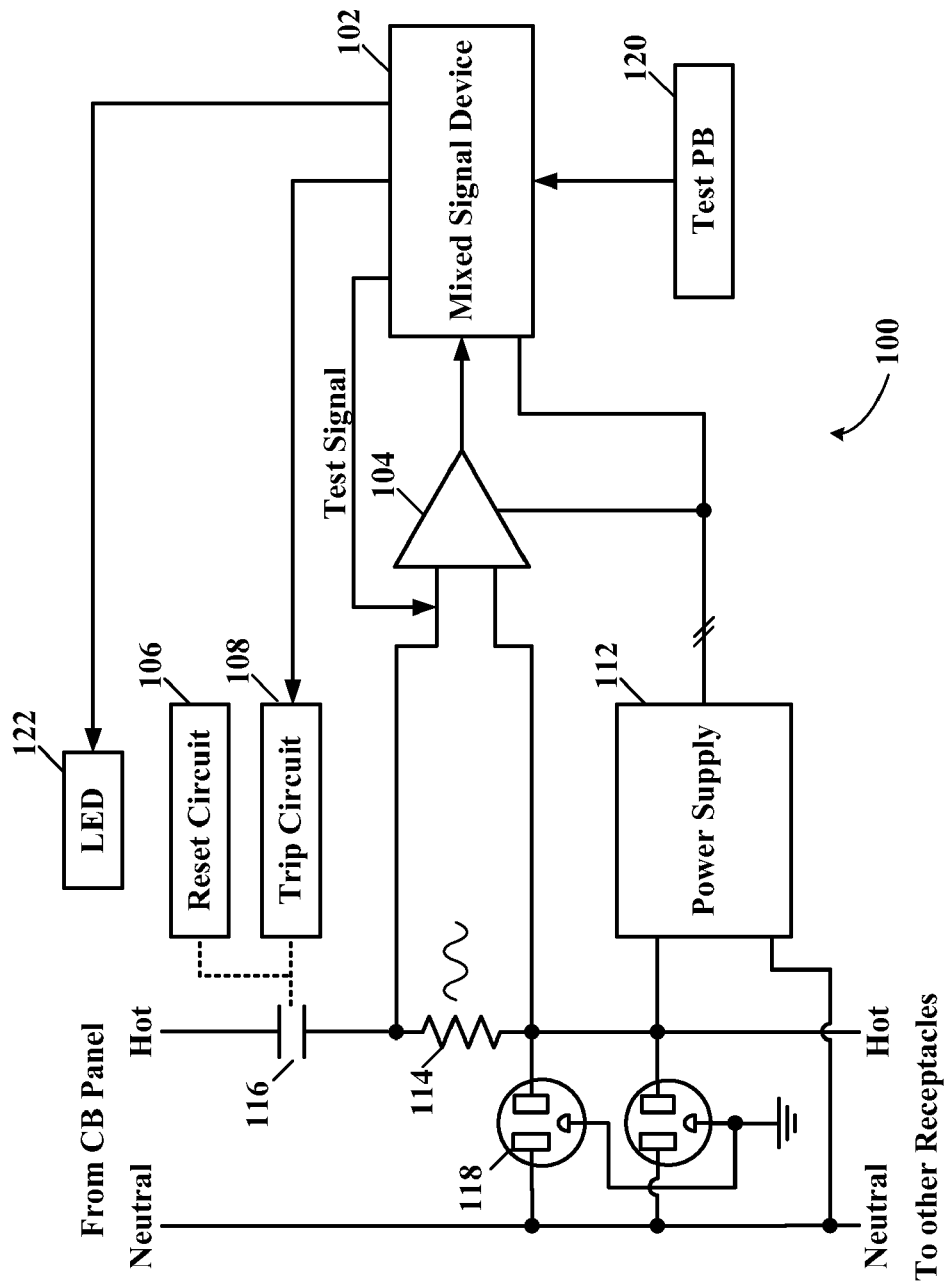
FIG. 1 illustrates a schematic block diagram of an arc fault circuit interrupter (AFCI), according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION OF THE EXEMPLARY EMBODIMENTS

Referring now to the drawings, details of a specific example embodiment of the present invention are schematically illustrated. Like elements in the drawings will be represented by like numbers, and similar elements will be represented by like numbers with a different lower case letter suffix.

Referring to FIG. 1, depicted is a schematic block diagram of an arc fault circuit interrupter (AFCI), according to a specific example embodiment of this disclosure. The AFCI, generally represented by the numeral 100, comprises a mixed signal (analog and digital) integrated circuit device 102, a wide bandwidth (high slew rate) differential input amplifier 104, a power supply 112 for powering the mixed signal device 102 and the differential input operational amplifier 104, a series connected resistor 114 for measurement of current, a circuit interrupting contact 116, a trip circuit 108 for tripping the circuit interrupting contact 116, a reset circuit 106 for resetting the circuit interrupting contact 116, and a test push button 120 for testing the AFCI 100. In addition, a light emitting diode (LED) 122 may be included to indicate when the AFCI 100 is operational. The AFCI 100 may be implemented as an outlet branch circuit (OBC) device by including a outlet receptacle 118 (dual 120 volt receptacles shown), or it may be incorporated into a circuit breaker (not shown), a motor starter (not shown), electrical appliances, electrical tools, plug extension receptacles and outlets, work lights, dwelling lighting outlets, etc.

In normal operation, the circuit interrupting contact 116 is held closed, e.g., through mechanical means, and the power supply 112 provides operating voltage(s) to the mixed signal device 102 and the differential input operational amplifier 104. It is contemplated and within the scope of this disclosure that the differential input operational amplifier 104 may be part of the mixed signal integrated circuit device 102, or it may be a separate integrated circuit device depending upon operating requirements. The series resistor 114 is a low resistance value resistor used as a current shunt for producing a small voltage signal to the differential inputs of the operational amplifier 104. This small voltage signal is proportional to the amount of current being drawn by utilization equipment connected to the hot and neutral of the branch circuit being fed from the circuit breaker (CB) panel, and/or by an arc (series) or arc fault (parallel between conductors). Furthermore, a high frequency noise signal generated by an arc upstream or downstream of the AFCI 100 will be present at the series resistor 114 since the branch circuit wiring acts as an antenna to pick up the arc noise signal generated anywhere on the branch circuit wires.

The AFCI 100 additionally includes testing means activated by a test pushbutton 120 that causes the mixed signal device 102 to generate a test signal that is applied to the "front end" of the arc detection circuit beginning at the input to the operational amplifier 104. The test signal replicates the high frequency noise signal present during an arc event. The power supply 112 may be a high efficiency switch mode power supply that creates the necessary voltages to power the electronic circuits in the operational amplifier 104 and the mixed signal device 102. The mixed signal device 102 may be, for example but is not limited to, a microcontroller having volatile and nonvolatile memories shown as memory 225, and a software program for controlling the various calculations, functions and operations thereof.

Figure 2:
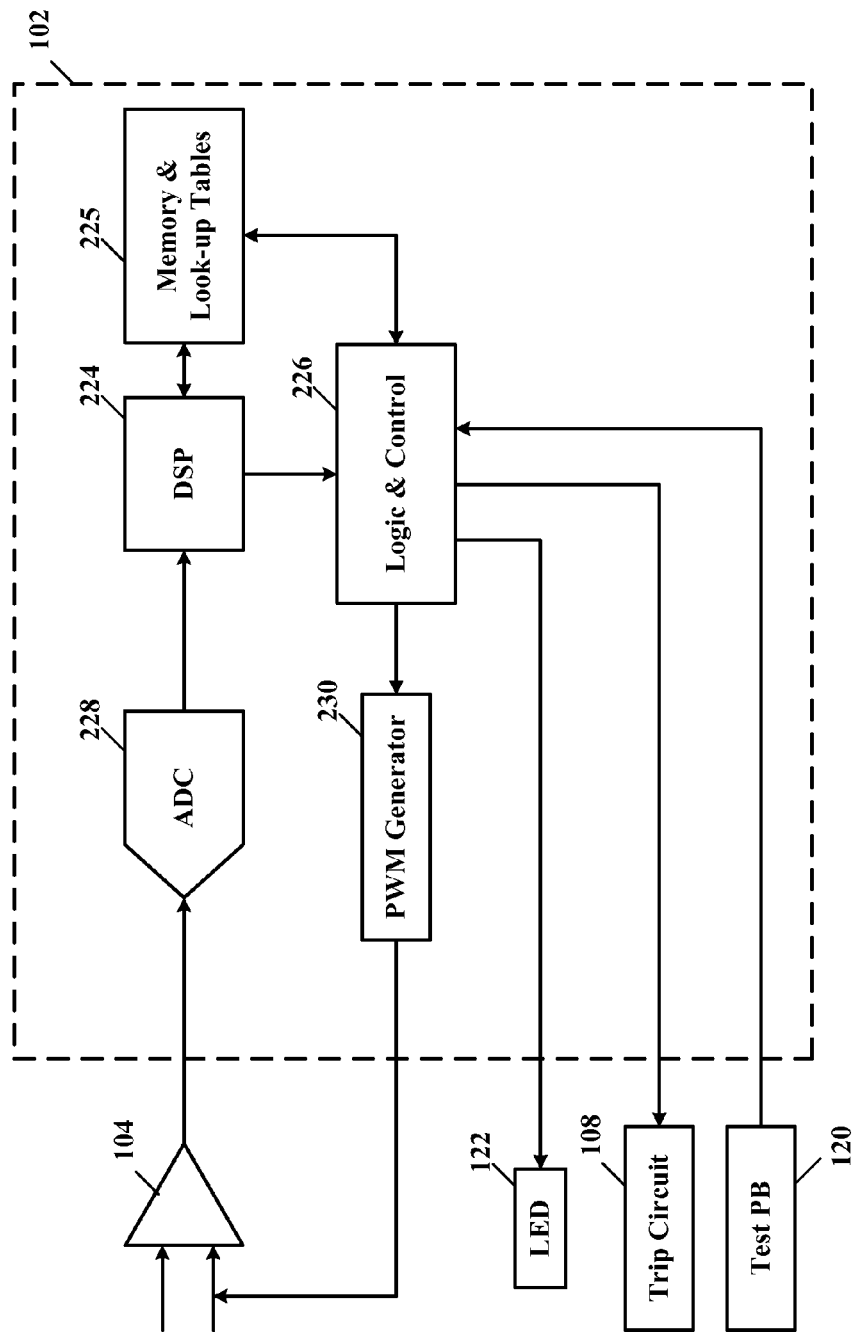
FIG. 2 illustrates a more detailed schematic block diagram of a portion of the AFCI shown in FIG. 1, according to a specific example embodiment of this disclosure.

Referring to FIG. 2, depicted is a more detailed schematic block diagram of a portion of the AFCI shown in FIG. 1, according to a specific example embodiment of this disclosure. The mixed signal device 102 comprises a digital signal processor (DSP) 224, logic and control circuits 226, an analog-to-digital converter (ADC) 228, and a pulse width modulation (PWM) generator 230. The mixed signal device 102 may also include the operational amplifier 104, or the operational amplifier 104 may be a separate high speed, wide bandwidth integrated circuit device. The operational amplifier 104 amplifies the small voltage signal from the series resistor 114 representative of the current flowing therethrough, and any conducted high frequency noise signal generated by an arc anywhere along the branch circuit.

Figure 3:
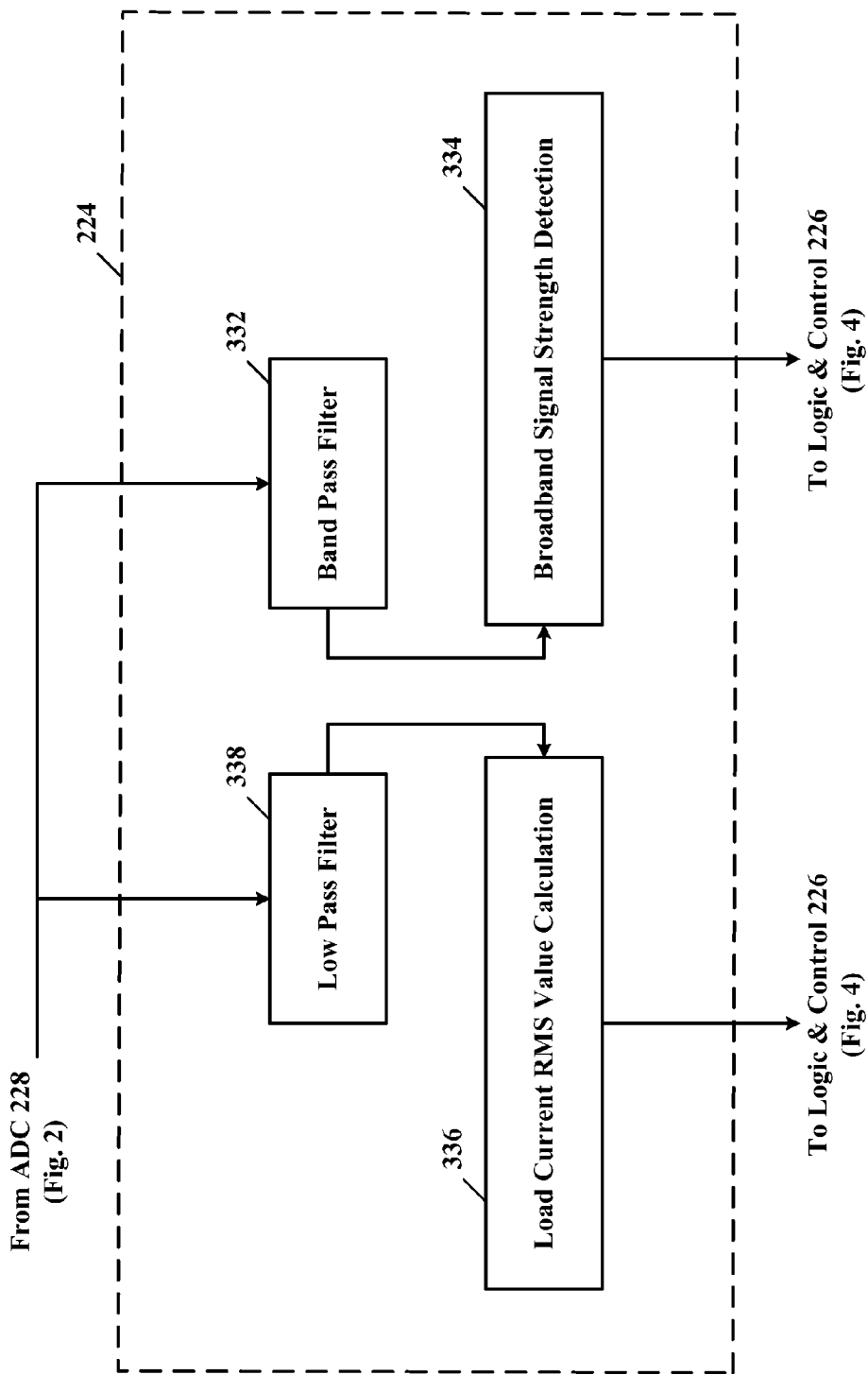
FIG. 3 illustrates a functional block diagram of a digital signal processing (DSP) portion of the AFCI shown in FIG. 2, according to a specific example embodiment of this disclosure.

The ADC 228 converts the amplified analog signals from the operational amplifier 104 into digital representations thereof. The sampling rate of the ADC 228 will be at least twice the maximum frequency of interest, e.g., highest cutoff frequency of the band pass filter 332 (FIG. 3). These digital representations of the amplified analog signals are applied to the DSP 224 for processing. The logic and control circuits 226 receive the processed information from the DSP 224 and act accordingly, as more fully described hereinafter. The logic and control circuits 226 also control the trip circuit 108, LED 122, and the PWM generator 230. The test pushbutton 120, when pushed, will activate an arc fault test routine in the logic and control circuits 226, and the PWM generator 230 will generate a PWM signal that substantially replicates the noise signal caused by the occurrence of an arc.

Referring to FIG. 3, depicted is a functional block diagram of the digital signal processing (DSP) portion of the AFCI shown in FIG. 2, according to a specific example embodiment of this disclosure. The DSP 224 comprises the following functions: a low pass filter function 338, a band pass filter function 332, a broadband signal strength detection function 334, and a load current root-mean-square (RMS) value calculation function 336.

The low pass filter function 338 may be a finite impulse response (FIR) filter implemented in the DSP software and is used to attenuate (e.g., substantially reject) signal energy above about one kilohertz (kHz). The 60 Hz line signals, i.e., load current values, easily pass through this low pass filter function 338. It is contemplated and within the scope of this disclosure that any type of low pass filter implementation, e.g., hardware and/or software, may be utilized for the low pass filter function 338.

As an example, a possible alternative embodiment of the low-pass filter function 338 can be implemented by simply taking advantage of the inherent filtering properties associated with sampling a signal at a specified frequency rate, e.g., Nyquist sampling rate. Sampling at the Nyquist rate only allows capture of frequencies up to half of the sampling frequency. Furthermore this filtering implementation can be extended by using a higher sampling frequency than twice the frequencies of interest and then decimate the collected sample data by only taking some of the samples (equally spaced in time) of the collected data and discarding the rest.

The band pass filter function 332 may also be a finite impulse response (FIR) filter implemented in the DSP software and is used to attenuate (e.g., substantially reject) signal energy not in its band pass frequency range of from about 10 kHz to about 100 kHz. The expected energy frequency spectrum from an arc will easily pass through this band pass filter function 332, while the 60 Hz line signal will be greatly attenuated. It is contemplated and within the scope of this disclosure that any type of band pass filter implementation, e.g., hardware and/or software, may be utilized for the band pass filter function 332.

The broadband signal strength detection function 334 determines the energy levels (e.g., signal strengths) of the radio frequency signals from the band pass filter function 332, e.g., signals from about 10 kHz to about 100 kHz, and are used in determining the presence of an arc (e.g., the greater the level of energy in the 10 kHz to 100 kHz, the higher the probability that an arc is occurring in the branch circuit.

The load current root-mean-square (RMS) value calculation function 336 performs calculations of the RMS voltage values based upon the voltage amplitudes and waveforms of the low pass filtered signal from the low pass filter function 338. These RMS voltage values are used in determining how fast to trip open the circuit interrupting contact 116 once a certain level of arcing has been determined, as more fully described hereinafter.

Figure 4:
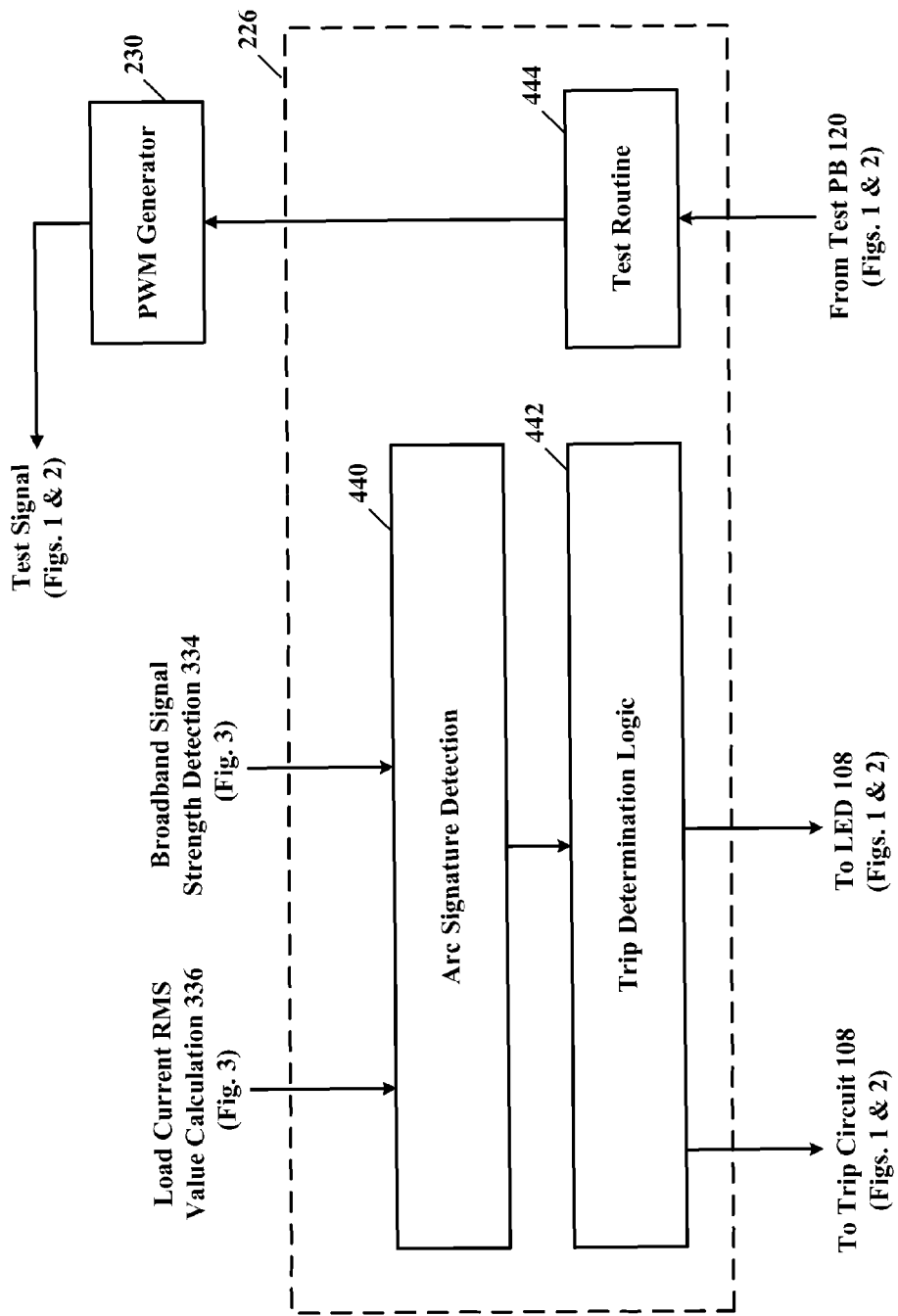
FIG. 4 illustrates a functional block diagram of a logic and control portion of the AFCI shown in FIG. 2, according to a specific example embodiment of this disclosure.

Referring to FIG. 4, depicted is a functional block diagram of the logic and control portion of the AFCI shown in FIG. 2, according to a specific example embodiment of this disclosure. The logic and control circuits 226 comprise arc signature detection logic 440, trip determination logic 442, and test routine logic 444.

Figure 5:
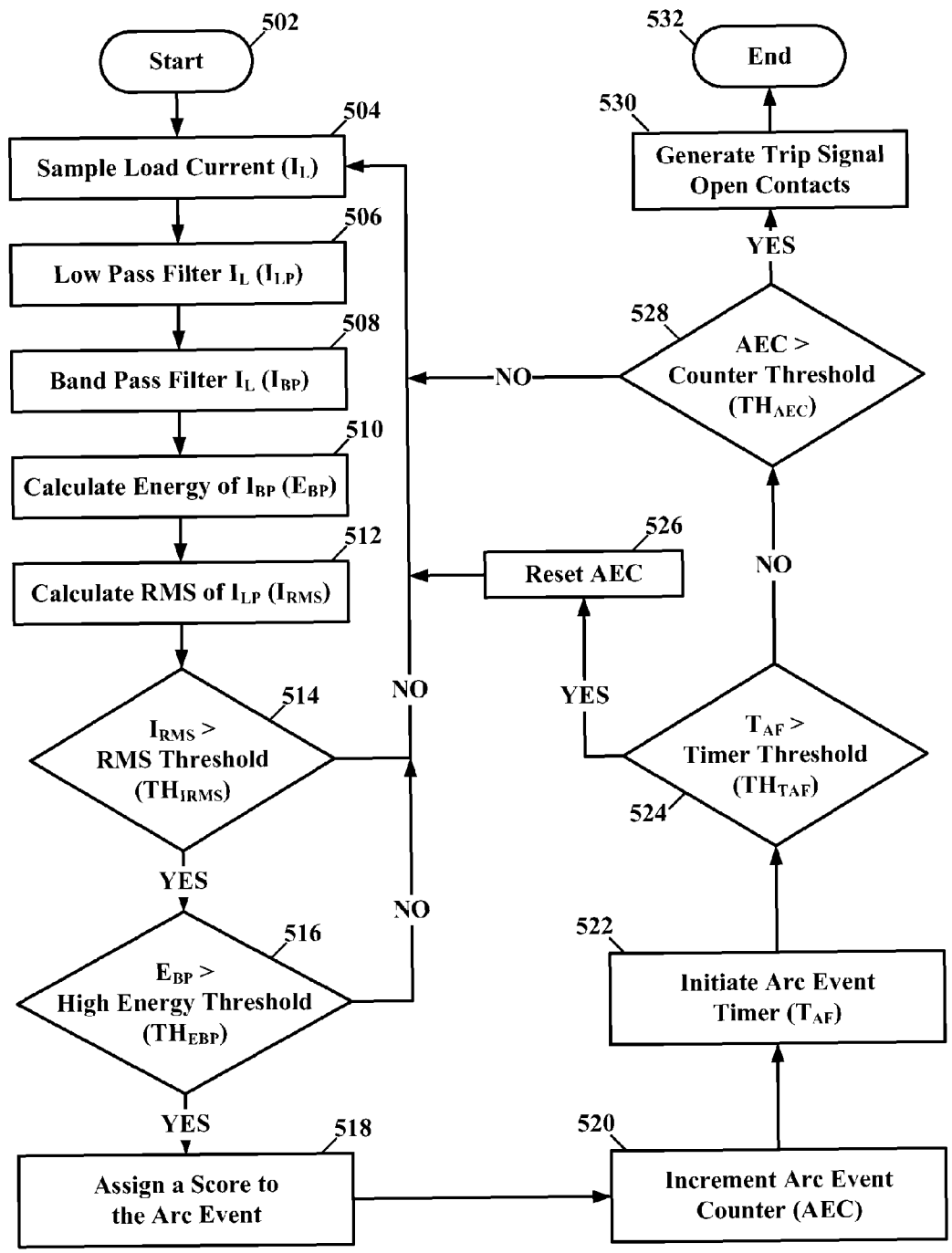
FIG. 5 illustrates a process flow diagram of the AFCI, according to a specific example embodiment of this disclosure.

The arc signature detection logic 440 compares the band pass filtered signal strength (energy) received from the band pass filter function 332 to an arc energy threshold value during each half cycle of the 60 Hz line frequency (i.e., 120 times per second). Other comparison time periods may be used and are contemplated herein. When the signal strength within each time period, e.g., $\frac{1}{120}$ of a second, is greater than the arc energy threshold, an arc event counter is incremented (FIG. 5). The band pass filtered signal strength is an integration (addition) of the band pass filtered energy signal samples taken during each half cycle of the 60 Hz line frequency.

In addition, the load current RMS values from the RMS value calculation function 336 are compared with preprogrammed RMS values and their respective arc count values, e.g., in a look-up table stored in a memory 225. Wherein when the load current RMS values are large, a fewer number of arc events (stored in the arc event counter) will cause the trip determination logic to signal the trip circuit 108 to open the circuit interrupting contact 116 and thereby remove line voltage from all devices connected to the AFCI 100.

The trip determination logic 442 has an arc timer (not shown) that is used to reset the arc event counter if there is an insufficient number of arc event counts based upon the load current RMS value (determined from the look-up table) within the time period programmed into the arc timer.

The test routine logic 444 is activated by the test push button 120, and when activated causes the PWM generator 230 to supply a signal similar to signals caused by arc events. The test signal from the PWM generator 230 is applied to the input of the operational amplifier 104, thereby simulating an arc signal to test the entire AFCI 100 for proper operation. Once the test has completed successfully (AFCI 100 disconnects from the power source), the AFCI 100 is reset with the reset circuit 106 that closes and latches the circuit interrupting contact(s) 116. Another embodiment may further comprise a test button 120 for testing the mechanism responsible for opening the contacts and using the reset circuit 106 to activate the test routine logic 444 which would cause the PWM generator 230 to mimic the presence of arcing in the line by injecting a signal to validate the functionality of the entire AFCI 100. The result of this stimulation generates a mechanical action that creates a latching condition which allows the circuit interrupting contact(s) 116 to close and remain closed. If the test fails to generate a trip signal, then the AFCI 100 will be prevented from resetting and the circuit interrupting contact(s) 116 will not close, thereby preventing voltage being applied to the downstream branch circuit from a defective AFCI 100.

Referring to FIG. 5, depicted is a process flow diagram of the AFCI, according to a specific example embodiment of this disclosure. In step 502, the AFCI 100 is activated by, for example, activating the reset circuit 106 which closes the contact 116 and applies branch circuit voltage to the power supply 112 which then supplies operating voltage(s) to the electronics of the AFCI 100 (amplifier 104 and mixed signal device 102). Once the AFCI 100 has been activated, in step 504, a current being drawn by a load and/or an arc is determined by sampling voltages across the resistor 114 at appropriate sampling rates, e.g., at least twice the maximum frequency of interest, e.g., highest cutoff frequency of the band pass filter 332. These voltages are amplified by the operational amplifier 104 and then input into the mixed signal device 102 where these analog voltages are converted into digital values by the ADC 228.

In step 506, the digital values from the ADC 228 are low pass filtered to about one (1) kHz and below, with the digital low pass filter 338 to produce low pass current values $I_{LP}$. In step 508, the digital values from the ADC 228 are band pass filtered from about 10 kHz to about 100 kHz, with the digital band pass filter 332 to produce band pass current values $I_{BP}$.

In step 510, band pass energy $E_{BP}$ is calculated by integrating (e.g., adding together) the $I_{BP}$ values taken over the comparison time periods, e.g., during each half cycle of the 60 Hz line frequency (i.e., 120 times per second). In step 512, the RMS current values $I_{RMS}$ are calculated from the low pass current values $L_{LP}$.

In step 514, a comparison is made between the RMS current values $I_{RMS}$ and a RMS threshold value $TH_{IRMS}$ (programmable). If the RMS current values $I_{RMS}$ are less than or equal to the RMS threshold value $TH_{IRMS}$, then return to step 504. However, if the RMS current values $I_{RMS}$ are greater than the RMS threshold value $TH_{IRMS}$, then proceed to step 516. In step 516, a comparison is made between the band pass energy value $E_{BP}$ and a high energy threshold value $TH_{EBP}$ (programmable). If the band pass energy value $E_{BP}$ is less than or equal to the high energy threshold value $TH_{EBP}$, then return to step 504. However, if the band pass energy value $E_{BP}$ is greater than the high energy threshold value $TH_{EBP}$, then proceed to step 518. The RMS threshold value $TH_{IRMS}$ and/or the high energy threshold value $TH_{EBP}$ may be programmably changed, depending upon the RMS current values $I_{RMS}$, e.g., from a preprogrammed look-up table in the memory 225.

In step 518, a score (programmable) is assigned to the arc event determined from steps 514 and 516. This score may be weighted depending upon the associated RMS current values $I_{RMS}$. If the score associated with the arc event is sufficient (programmable), then in step 520 an arc event counter (AEC) is incremented, and in step 522 an arc event timer $T_{AF}$ starts timing. In step 524, a comparison is made between the time value of the arc event timer $T_{AF}$ and a timer threshold value $TH_{TAF}$ (programmable). If the time value of the arc event timer $T_{AF}$ is greater than the timer threshold value $TH_{TAF}$, then in step 526 the arc event counter AEC is reset and thereafter return to step 504. However, if the time value of the arc event timer $T_{AF}$ is less than or equal to the timer threshold value $TH_{TAF}$, then proceed to step 528.

In step 528, a comparison is made between the count in the AEC and an arc event count threshold $TH_{AEC}$ (programmable). If the count in the arc event counter AEC is less than or equal to the arc event count threshold $TH_{AEC}$, then return to step 504. However, if the count in the arc event counter AEC is greater than the counter threshold $TH_{AEC}$, then in step 530 a trip signal is generated to open the circuit interrupting contact 116, thereby ending operation of the AFCI 100 in step 532. The AFCI 100 must be reset before beginning again at step 502.

Figure 6:
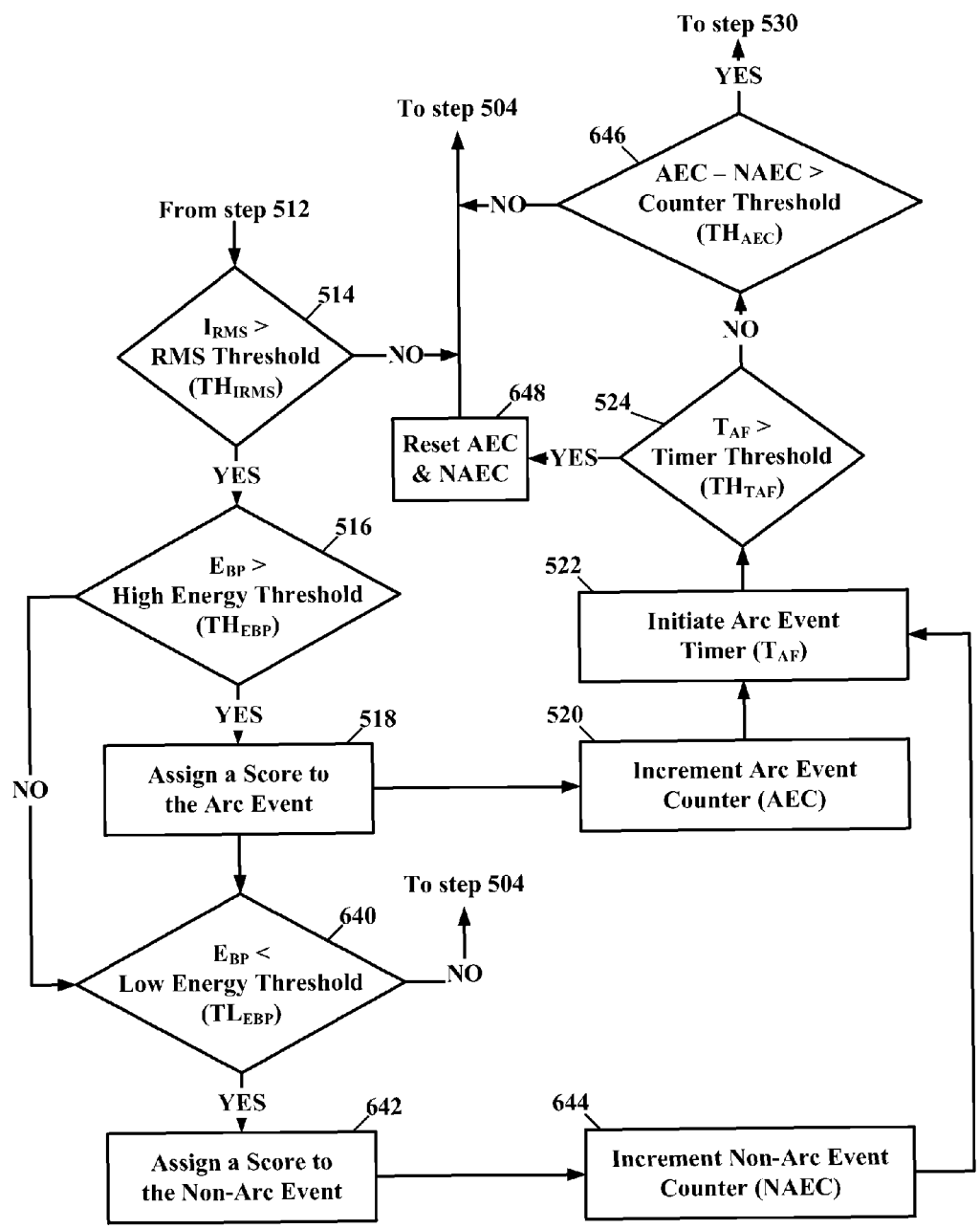
FIG. 6 illustrates a process flow diagram of the AFCI, according to another specific example embodiment of this disclosure.

Referring to FIG. 6, depicted is a process flow diagram of the AFCI, according to another specific example embodiment of this disclosure. Operation of the AFCI 100 according to the flow diagram of FIG. 6 is similar to the operation thereof shown in FIG. 5, except that in step 640, a comparison is made between the band pass energy value $E_{BP}$ and a low energy threshold value $TL_{EBP}$ (programmable). In step 642, a score (programmable) is assigned to the arc event determined from step 640. This score may be weighted depending upon the associated RMS current values $I_{RMS}$. If the score associated with the non-arc event is sufficient (programmable), then in step 644 a non-arc event counter (NAEC) is incremented, and in step 522 the arc event timer $T_{AF}$ starts timing, if not already started by step 520.

In step 524, a comparison is made between the time value of the arc event timer $T_{AF}$ and a timer threshold value $TH_{TAF}$ (programmable). If the time value of the arc event timer $T_{AF}$ is greater than the timer threshold value $TH_{TAF}$, then in step 648 the AEC and the NAEC are reset and thereafter return to step 504. However, if the time value of the arc event timer $T_{AF}$ is less than or equal to the timer threshold value $TH_{TAF}$, then proceed to step 646.

In step 646, a comparison is made between the difference in counts between the AEC and NAEC (AEC–NAEC) and a counter threshold (count) $TH_{AEC}$ (programmable). If the difference in counts is less than or equal to the counter threshold $TH_{AEC}$, then return to step 504. However, if the difference in counts is greater than the counter threshold $TH_{AEC}$, then in step 530 a trip signal is generated to open the circuit interrupting contact 116, thereby ending operation of the AFCI 100 in step 532. The AFCI 100 must be reset before beginning again at step 502. Using the difference between the AEC count value and the NAEC count value reduces the likelihood of false tripping of the AFCI 100.

Figure 7:
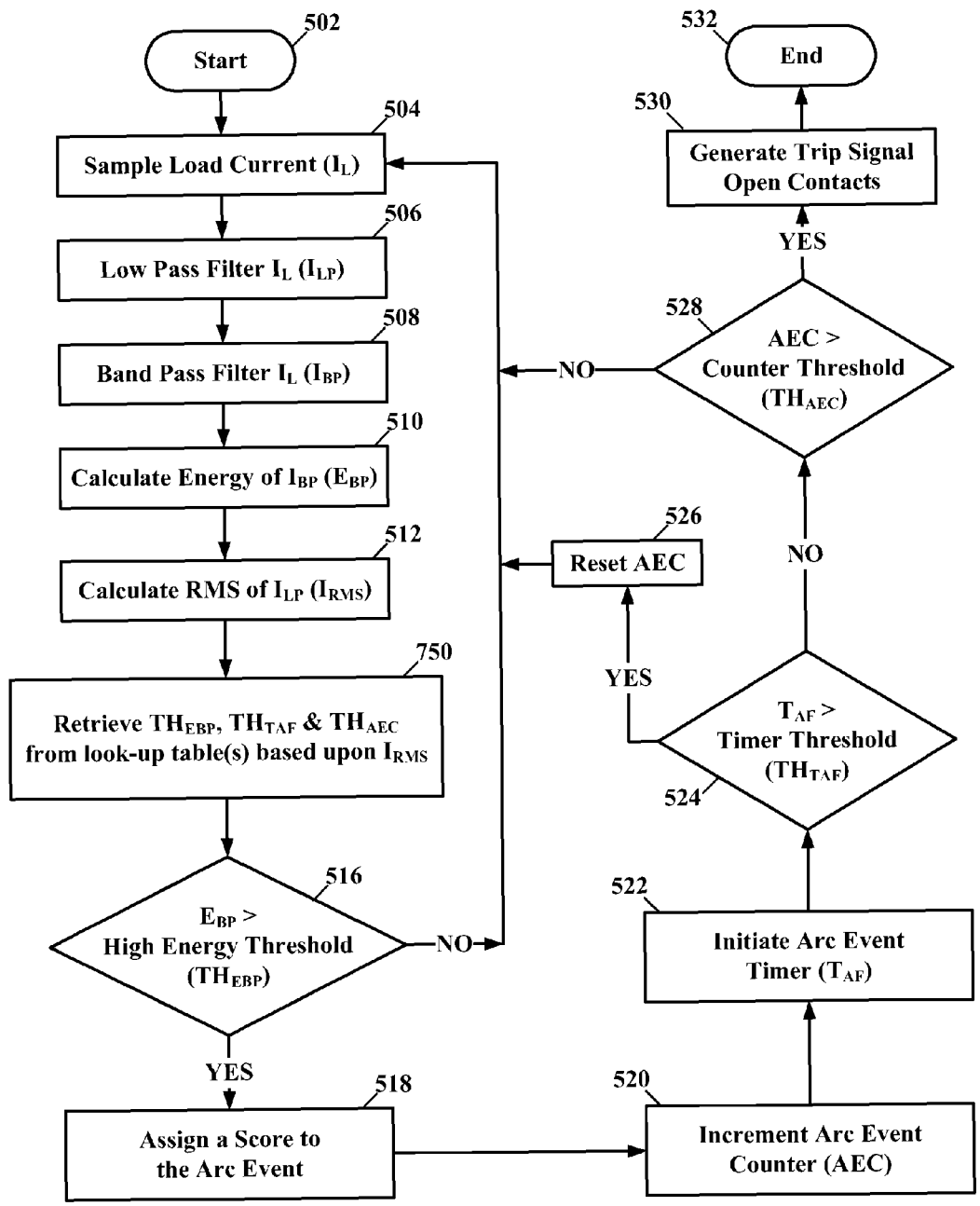
FIG. 7 illustrates a process flow diagram of the AFCI, according to yet another specific example embodiment of this disclosure.

Referring to FIG. 7, depicted is a process flow diagram of the AFCI, according to yet another specific example embodiment of this disclosure. Operation of the AFCI 100 according to the flow diagram of FIG. 7 is similar to the operation thereof shown in FIG. 5, except that step 514 is replace by step 750, wherein at least one of the high energy threshold value $TH_{EBP}$, the timer threshold value $TH_{TAF}$, and/or the counter threshold $TH_{AEC}$ are retrieved from a look-up table(s) based upon the RMS current values $I_{RMS}$. According to this embodiment one or more of these threshold values may be dynamically allocated based upon the most recently calculated RMS current value $I_{RMS}$.

Figure 8:
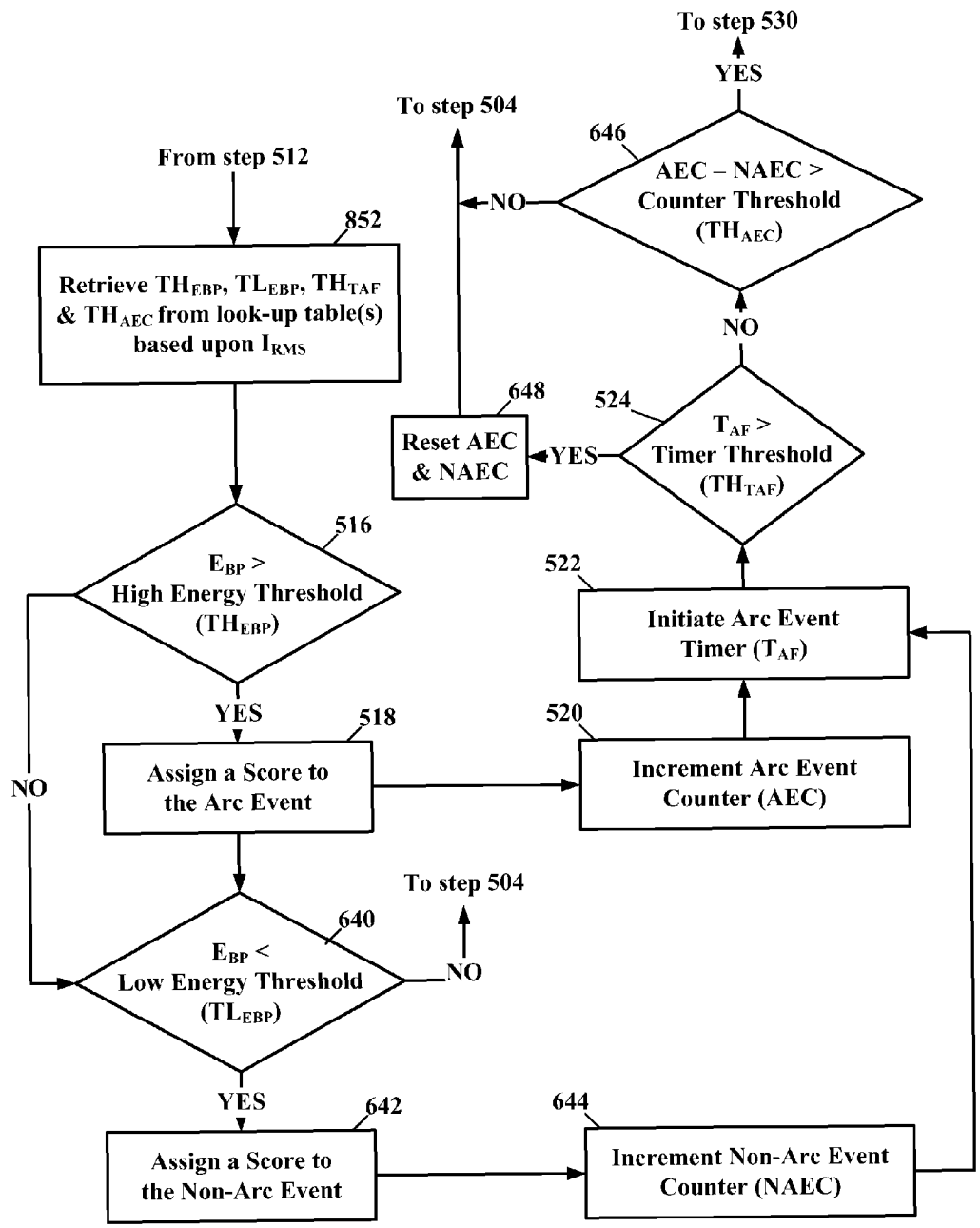
FIG. 8 illustrates a process flow diagram of the AFCI, according to still another specific example embodiment of this disclosure.

Referring to FIG. 8, depicted is a process flow diagram of the AFCI, according to still another specific example embodiment of this disclosure. Operation of the AFCI 100 according to the flow diagram of FIG. 8 is similar to the operation thereof shown in FIGS. 5 and 6, except that step 514 is replace by step 852, wherein at least one of the high energy threshold value $TH_{EBP}$, the low energy threshold value $TL_{EBP}$, the timer threshold value $TH_{TAF}$, and/or the counter threshold $TH_{AEC}$ are retrieved from a look-up table(s) based upon the RMS current values $I_{RMS}$. According to this embodiment one or more of these threshold values may be dynamically allocated based upon the most recently calculated RMS current value $I_{RMS}$. Using the difference between the AEC count value and the NAEC count value reduces the likelihood of false tripping of the AFCI 100.

Figure 9:
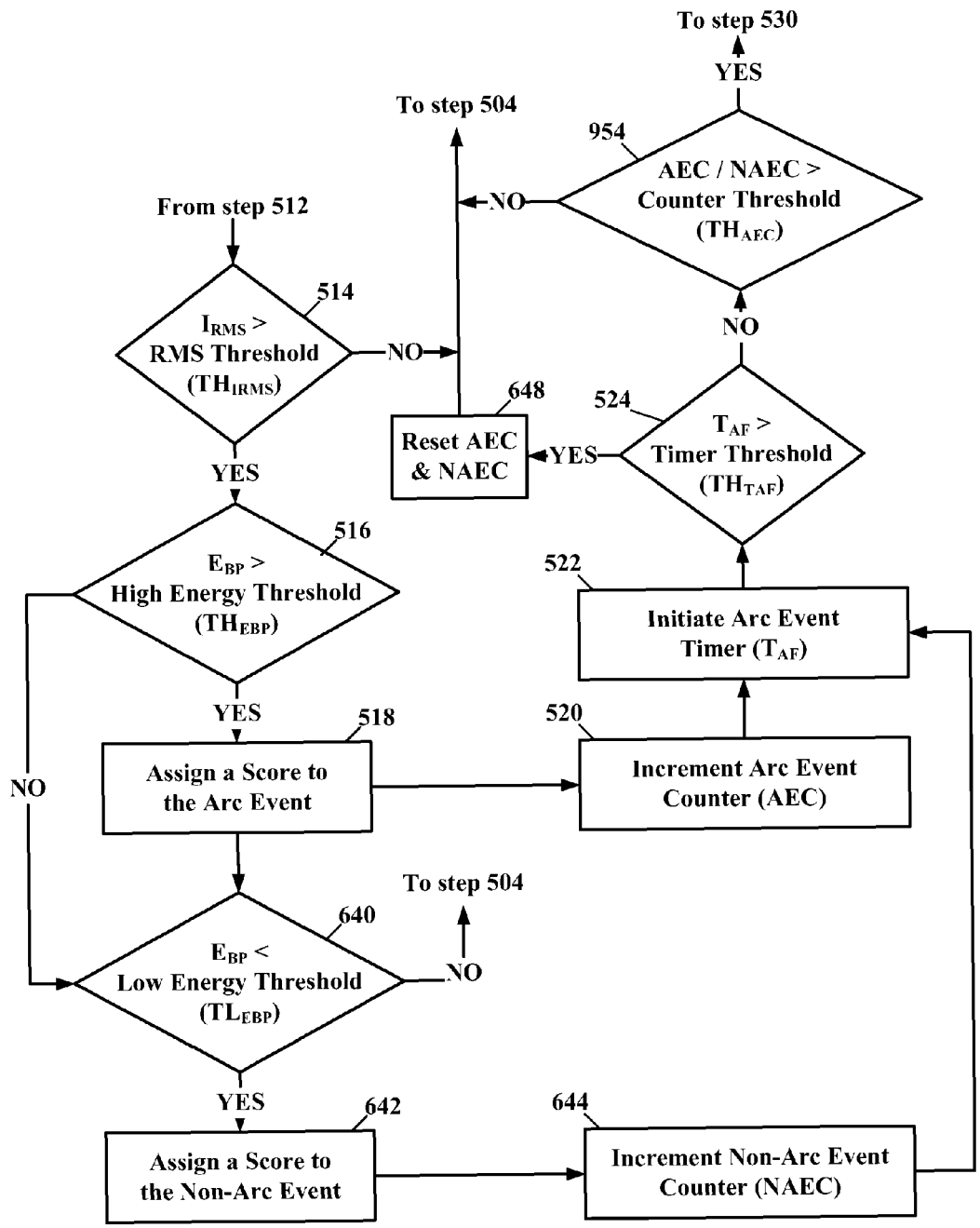
FIG. 9 illustrates a process flow diagram of the AFCI, according to another specific example embodiment of this disclosure.

Referring to FIG. 9, depicted is a process flow diagram of the AFCI, according to another specific example embodiment of this disclosure. Operation of the AFCI 100 according to the flow diagram of FIG. 9 is similar to the operation thereof shown in FIGS. 5 and 6, except that step 646 is replace by step 954, wherein the ratio of AEC/NAEC is compared to the counter threshold $TH_{AEC}$. In step 954, a comparison is made between the ratio of counts in the AEC and in the NAEC (AEC/NAEC) and a counter threshold (count) $TH_{AEC}$ (programmable). If the ratio of the counts is less than or equal to the counter threshold $TH_{AEC}$, then return to step 504. However, if the ratio of the counts is greater than the counter threshold $TH_{AEC}$, then in step 530 a trip signal is generated to open the circuit interrupting contact 116, thereby ending operation of the AFCI 100 in step 532. The AFCI 100 must be reset before beginning again at step 502. Using the ratio of the AEC count value and the NAEC count value reduces the likelihood of false tripping of the AFCI 100.

Figure 10:
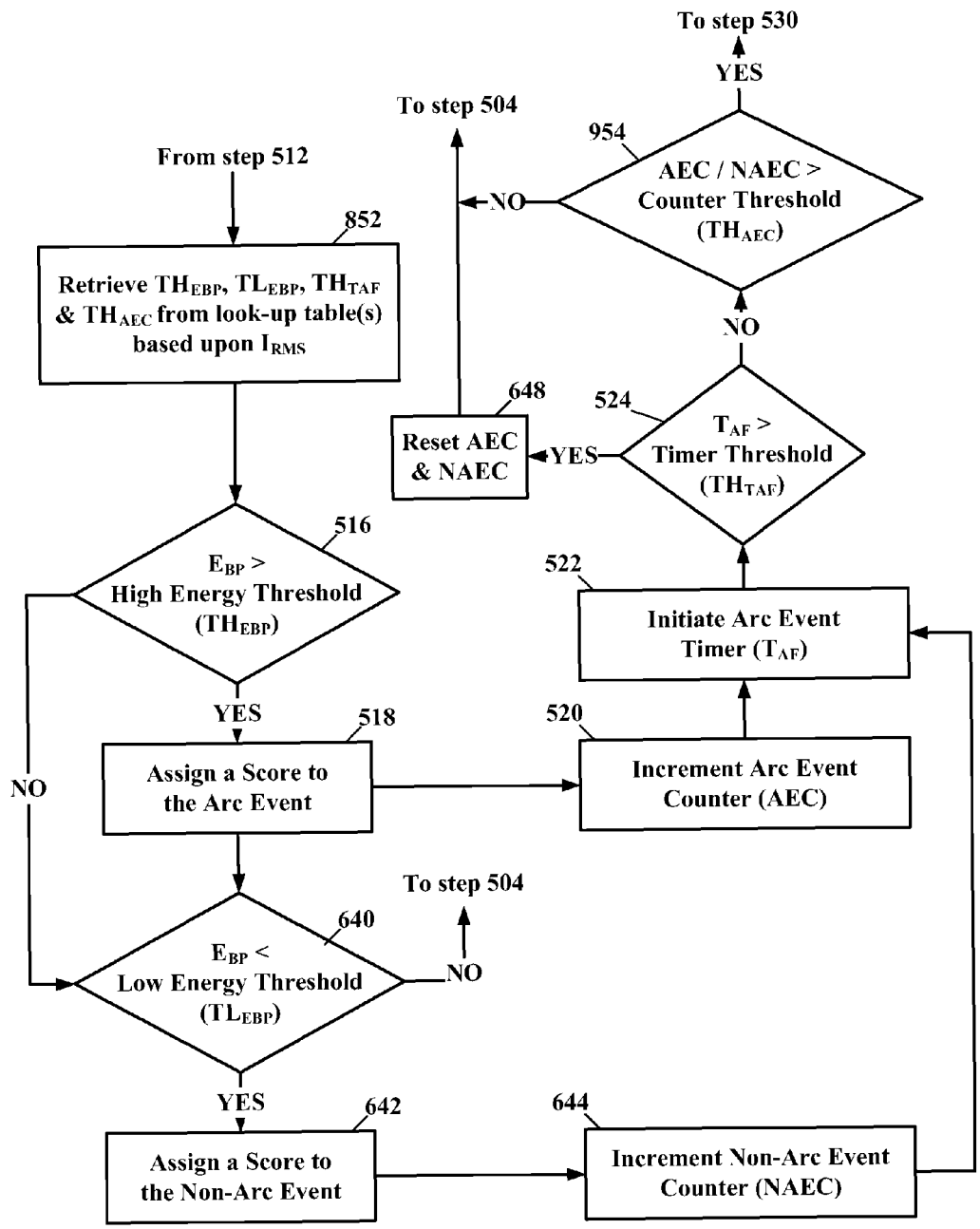
FIG. 10 illustrates a process flow diagram of the AFCI, according to yet another specific example embodiment of this disclosure.

Referring to FIG. 10, depicted is a process flow diagram of the AFCI, according to yet another specific example embodiment of this disclosure. Operation of the AFCI 100 according to the flow diagram of FIG. 10 is similar to the operation thereof shown in FIGS. 5 and 8, except that step 646 is replace by step 954. In step 954, a comparison is made between the ratio of counts in the AEC and in the of NAEC (AEC/NAEC) and a counter threshold (count) $TH_{AEC}$ (programmable). If the ratio of the counts is less than or equal to the counter threshold $TH_{AEC}$, then return to step 504. However, if the ratio of the counts is greater than the counter threshold $TH_{AEC}$, then in step 530 a trip signal is generated to open the circuit interrupting contact 116, thereby ending operation of the AFCI 100 in step 532. The AFCI 100 must be reset before beginning again at step 502. Using the ratio of the AEC count value and the NAEC count value reduces the likelihood of false tripping of the AFCI 100.

Figure 11:
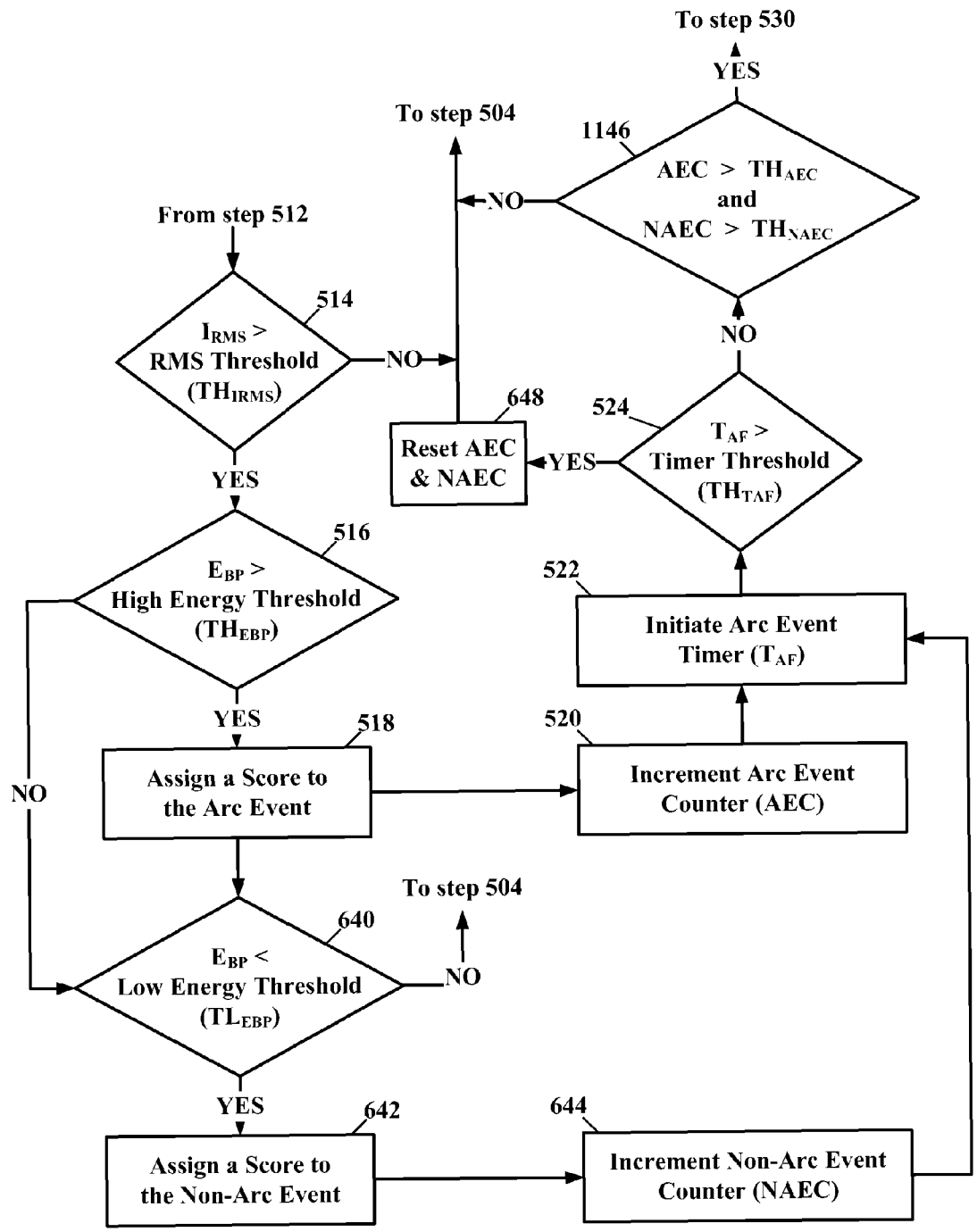
FIG. 11 illustrates a process flow diagram of the AFCI, according to still another specific example embodiment of this disclosure.

Referring to FIG. 11, depicted is a process flow diagram of the AFCI, according to still another specific example embodiment of this disclosure. Operation of the AFCI 100 according to the flow diagram of FIG. 11 is similar to the operation thereof shown in FIGS. 5 and 6, except that step 646 is replace by step 1146, wherein at least two independent conditions have to be met to generated a trip signal to open the circuit interrupting contact 116. In step 1146, a comparison is made between the counts in the AEC against an arc count threshold value $TH_{AEC}$ (programmable) and a second comparison between the counts in a non-arc counter threshold value $TH_{NAEC}$ (programmable). If either one of these two conditions is not met, then return to step 504. However, if both conditions are met, then in step 530 a trip signal is generated to open the circuit interrupting contact 116, thereby ending operation of the AFCI 100 in step 532. The AFCI 100 must be reset before beginning again at step 502. Using the condition requirements of both the AEC count value and the NAEC count value reduces the likelihood of false tripping of the AFCI 100.

Figure 12:
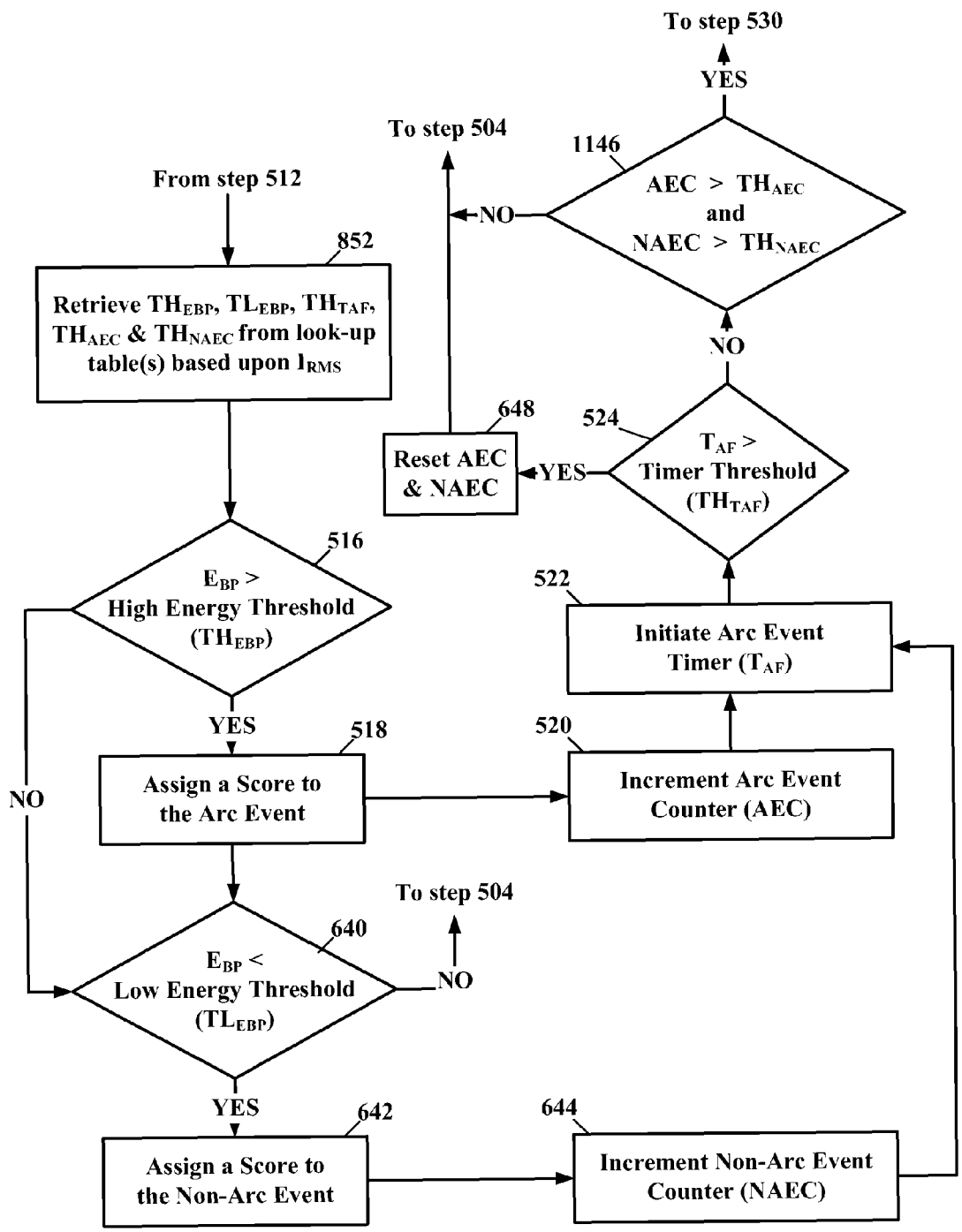
FIG. 12 illustrates a process flow diagram of the AFCI, according to another specific example embodiment of this disclosure.

Referring to FIG. 12, depicted is a process flow diagram of the AFCI, according to another specific example embodiment of this disclosure. Operation of the AFCI 100 according to the flow diagram of FIG. 12 is similar to the operation thereof shown in FIGS. 5 and 8, except that step 646 is replace by step 1146, wherein at least two independent conditions are met. In step 1146, a comparison is made between the counts in the AEC against an arc count threshold value $TH_{AEC}$ (programmable) and a second comparison between the counts in a non-arc counter threshold value $TH_{NAEC}$ (programmable). If either one of these two conditions is not met, then return to step 504. However, if both conditions are met, then in step 530 a trip signal is generated to open the circuit interrupting contact 116, thereby ending operation of the AFCI 100 in step 532. The AFCI 100 must be reset before beginning again at step 502. Using the condition requirements of both the AEC count value and the NAEC count value reduces the likelihood of false tripping of the AFCI 100.

Although specific example embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

We claim:

1. A method for determining when an arc fault occurs and thereafter disconnecting a supply voltage from the arc fault, said method comprising the steps of:
   a) sampling a load current with a current sampling circuit to produce a sampled current signal;
   b) processing the sampled current signal to produce a low frequency current signal having frequency components less than about one kilohertz;
   c) processing the sampled current signal to produce a band pass frequency current signal having frequency components from about ten kilohertz to about one hundred kilohertz;
   d) calculating an energy value of the band pass frequency current signal;
   e) calculating a root-mean-square (RMS) current value of the low pass frequency current signal;
   f) determining whether the RMS current value of the low pass frequency current signal is greater than an RMS threshold value, wherein if not greater then returning to step a) and if greater then going to step g);
   g) determining whether the energy value of the band pass frequency current signal is greater than a high energy threshold value, wherein if not greater then returning to step f) and if greater then going to step h);
h) assigning a score to an arc event;
i) incrementing an arc event count in an arc event counter;
j) starting an arc event time in an arc event timer;
k) determining whether the arc event time is greater than a time threshold value, wherein if greater then resetting the arc event count and returning to step a) and if not greater then going to step l);
l) determining whether the arc event count is greater than an arc event count threshold value, wherein if not greater then returning to step a) and if greater then going to step m); and
m) generating a trip signal for disconnecting the supply voltage from the arc fault.

2. A method for determining when an arc fault occurs and thereafter disconnecting a supply voltage from the arc fault, said method comprising the steps of:
a) sampling a load current with a current sampling circuit to produce a sampled current signal;
b) processing the sampled current signal to produce a low frequency current signal having frequency components less than about one kilohertz;
c) processing the sampled current signal to produce a band pass frequency current signal having frequency components from about ten kilohertz to about one hundred kilohertz;
d) calculating an energy value of the band pass frequency current signal;
e) calculating a root-mean-square (RMS) current value of the low pass frequency current signal;
f) determining whether the RMS current value of the low pass frequency current signal is greater than an RMS threshold value, wherein if not greater then returning to step a) and if greater then going to step g);
g) determining whether the energy value of the band pass frequency current signal is greater than a high energy threshold value, wherein if not greater then going to step h1) and if greater then going to step h);
h) assigning a score to an arc event then going to step i);
h1) determining whether the energy value of the band pass frequency current signal is less than a low energy threshold value, wherein if not less then returning to step a) and if less then going to step h2);
h2) assigning a score to a non-arc event;
i) incrementing an arc event count in an arc event counter;
j) starting an arc event time in an arc event timer;
k) determining whether the arc event time is greater than a time threshold value, wherein if greater then resetting the arc event and non-arc event counts and returning to step a) and if not greater then going to step l);
l) determining whether a difference between the arc event count and the non-arc event count is greater than an arc event count threshold value, wherein if not greater then returning to step a) and if greater then going to step m); and
m) generating a trip signal for disconnecting the supply voltage from the arc fault.

3. A method for determining when an arc fault occurs and thereafter disconnecting a supply voltage from the arc fault, said method comprising the steps of:
a) sampling a load current with a current sampling circuit to produce a sampled current signal;
b) processing the sampled current signal to produce a low frequency current signal having frequency components less than about one kilohertz;
c) processing the sampled current signal to produce a band pass frequency current signal having frequency components from about ten kilohertz to about one hundred kilohertz;
d) calculating an energy value of the band pass frequency current signal;
e) calculating a root-mean-square (RMS) current value of the low pass frequency current signal;
f) retrieving a high energy threshold value, a time threshold value and an arc event count threshold value from a look-up table based upon the RMS current value of the low pass frequency current signal;
g) determining whether the energy value of the band pass frequency current signal is greater than the high energy threshold value, wherein if not greater then returning to step f) and if greater then going to step h);
h) assigning a score to an arc event;
i) incrementing an arc event count in an arc event counter;
j) starting an arc event time in an arc event timer;
k) determining whether the arc event time is greater than the time threshold value, wherein if greater then resetting the arc event count and returning to step a) and if not greater then going to step l);
l) determining whether the arc event count is greater than the arc event count threshold value, wherein if not greater then returning to step a) and if greater then going to step m); and
m) generating a trip signal for disconnecting the supply voltage from the arc fault.

4. A method for determining when an arc fault occurs and thereafter disconnecting a supply voltage from the arc fault, said method comprising the steps of:
a) sampling a load current with a current sampling circuit to produce a sampled current signal;
b) processing the sampled current signal to produce a low frequency current signal having frequency components less than about one kilohertz;
c) processing the sampled current signal to produce a band pass frequency current signal having frequency components from about ten kilohertz to about one hundred kilohertz;
d) calculating an energy value of the band pass frequency current signal;
e) calculating a root-mean-square (RMS) current value of the low pass frequency current signal;
f) retrieving a high energy threshold value, a low energy threshold value, a time threshold value and an arc event count threshold value from a look-up table based upon the RMS current value of the low pass frequency current signal;
g) determining whether the energy value of the band pass frequency current signal is greater than the high energy threshold value, wherein if not greater then going to step h1) and if greater then going to step h);
h) assigning a score to an arc event then going to step i);
h1) determining whether the energy value of the band pass frequency current signal is less than the low energy threshold value, wherein if not less then returning to step a) and if less then going to step h2);
h2) assigning a score to a non-arc event;
i) incrementing an arc event count in an arc event counter;
j) starting an arc event time in an arc event timer;
k) determining whether the arc event time is greater than the time threshold value, wherein if greater then resetting the arc event and non-arc event counts and returning to step a) and if not greater then going to step l);

l) determining whether a difference between the arc event count and the non-arc event count is greater than the arc event count threshold value, wherein if not greater then returning to step a) and if greater then going to step m); and m) generating a trip signal for disconnecting the supply voltage from the arc fault.

5. A method for determining when an arc fault occurs and thereafter disconnecting a supply voltage from the arc fault, said method comprising the steps of:
   a) sampling a load current with a current sampling circuit to produce a sampled current signal;
   b) processing the sampled current signal to produce a low frequency current signal having frequency components less than about one kilohertz;
   c) processing the sampled current signal to produce a band pass frequency current signal having frequency components from about ten kilohertz to about one hundred kilohertz;
   d) calculating an energy value of the band pass frequency current signal;
   e) calculating a root-mean-square (RMS) current value of the low pass frequency current signal;
   f) determining whether the RMS current value of the low pass frequency current signal is greater than an RMS threshold value, wherein if not greater then returning to step a) and if greater then going to step g);
   g) determining whether the energy value of the band pass frequency current signal is greater than a high energy threshold value, wherein if not greater then going to step h1) and if greater then going to step h);
   h) assigning a score to an arc event then going to step i);
   h1) determining whether the energy value of the band pass frequency current signal is less than a low energy threshold value, wherein if not less then returning to step a) and if less then going to step h2);
   h2) assigning a score to a non-arc event;
   i) incrementing an arc event count in an arc event counter;
   j) starting an arc event time in an arc event timer;
   k) determining whether the arc event time is greater than a time threshold value, wherein if greater then resetting the arc event and non-arc event counts and returning to step a) and if not greater then going to step l);
   l) determining whether a ratio of the arc event count and the non-arc event count is greater than an arc event count threshold value, wherein if not greater then returning to step a) and if greater then going to step m); and
   m) generating a trip signal for disconnecting the supply voltage from the arc fault.

6. A method for determining when an arc fault occurs and thereafter disconnecting a supply voltage from the arc fault, said method comprising the steps of:
   a) sampling a load current with a current sampling circuit to produce a sampled current signal;
   b) processing the sampled current signal to produce a low frequency current signal having frequency components less than about one kilohertz;
   c) processing the sampled current signal to produce a band pass frequency current signal having frequency components from about ten kilohertz to about one hundred kilohertz;
   d) calculating an energy value of the band pass frequency current signal;
   e) calculating a root-mean-square (RMS) current value of the low pass frequency current signal;
   f) retrieving a high energy threshold value, a low energy threshold value, a time threshold value and an arc event count threshold value from a look-up table based upon the RMS current value of the low pass frequency current signal;
   g) determining whether the energy value of the band pass frequency current signal is greater than the high energy threshold value, wherein if not greater then going to step h1) and if greater then going to step h);
   h) assigning a score to an arc event then going to step i);
   h1) determining whether the energy value of the band pass frequency current signal is less than the low energy threshold value, wherein if not less then returning to step a) and if less then going to step h2);
   h2) assigning a score to a non-arc event;
   i) incrementing an arc event count in an arc event counter;
   j) starting an arc event time in an arc event timer;
   k) determining whether the arc event time is greater than the time threshold value, wherein if greater then resetting the arc event and non-arc event counts and returning to step a) and if not greater then going to step l);
   l) determining whether a ratio of the arc event count and the non-arc event count is greater than an arc event count threshold value, wherein if not greater then returning to step a) and if greater then going to step m); and
   m) generating a trip signal for disconnecting the supply voltage from the arc fault.

7. A method for determining when an arc fault occurs and thereafter disconnecting a supply voltage from the arc fault, said method comprising the steps of:
   a) sampling a load current with a current sampling circuit to produce a sampled current signal;
   b) processing the sampled current signal to produce a low frequency current signal having frequency components less than about one kilohertz;
   c) processing the sampled current signal to produce a band pass frequency current signal having frequency components from about ten kilohertz to about one hundred kilohertz;
   d) calculating an energy value of the band pass frequency current signal;
   e) calculating a root-mean-square (RMS) current value of the low pass frequency current signal;
   f) determining whether the RMS current value of the low pass frequency current signal is greater than an RMS threshold value, wherein if not greater then returning to step a) and if greater then going to step g);
   g) determining whether the energy value of the band pass frequency current signal is greater than a high energy threshold value, wherein if not greater then going to step h1) and if greater then going to step h);
   h) assigning a score to an arc event then going to step i);
   h1) determining whether the energy value of the band pass frequency current signal is less than a low energy threshold value, wherein if not less then returning to step a) and if less then going to step h2);
   h2) assigning a score to a non-arc event;
   i) incrementing an arc event count in an arc event counter;
   j) starting an arc event time in an arc event timer;
   k) determining whether the arc event time is greater than a time threshold value, wherein if greater then resetting the arc event and non-arc event counts and returning to step a) and if not greater then going to step l);
   l) determining whether the arc event count is greater than an arc event count threshold value and the non-arc event count is greater than a non-arc event count threshold value, wherein if either is not greater then returning to step a) and if both are greater then going to step m); and m) generating a trip signal for disconnecting the supply voltage from the arc fault.

8. A method for determining when an arc fault occurs and thereafter disconnecting a supply voltage from the arc fault, said method comprising the steps of:
a) sampling a load current with a current sampling circuit to produce a sampled current signal;
b) processing the sampled current signal to produce a low frequency current signal having frequency components less than about one kilohertz;
c) processing the sampled current signal to produce a band pass frequency current signal having frequency components from about ten kilohertz to about one hundred kilohertz;
d) calculating an energy value of the band pass frequency current signal;
e) calculating a root-mean-square (RMS) current value of the low pass frequency current signal;
f) retrieving a high energy threshold value, a low energy threshold value, a time threshold value, an arc event count threshold value and a non-arc event count threshold value from a look-up table based upon the RMS current value of the low pass frequency current signal;
g) determining whether the energy value of the band pass frequency current signal is greater than the high energy threshold value, wherein if not greater then going to step h1) and if greater then going to step h);
h) assigning a score to an arc event then going to step i);
h1) determining whether the energy value of the band pass frequency current signal is less than the low energy threshold value, wherein if not less then returning to step a) and if less then going to step h2);
h2) assigning a score to a non-arc event;
i) incrementing an arc event count in an arc event counter;
j) starting an arc event time in an arc event timer;
k) determining whether the arc event time is greater than the time threshold value, wherein if greater then resetting the arc event and non-arc event counts and returning to step a) and if not greater then going to step l);
l) determining whether the arc event count is greater than the arc event count threshold value and the non-arc event count is greater than the non-arc event count threshold value, wherein if either is not greater then returning to step a) and if both are greater then going to step m); and
m) generating a trip signal for disconnecting the supply voltage from the arc fault.

9. An arc fault circuit interrupter (AFCI) comprising:
a power source disconnect device coupled to a power source;
a load current measurement device coupled downstream of the power source disconnect device;
a trip circuit adapted to trip the power source disconnect device, wherein an electrical load is disconnected from the power source when the disconnect device is tripped;
a reset circuit adapted to reset the power source disconnect device, wherein an electrical load is connected to the power source when the disconnect device is reset;
a mixed signal integrated circuit device comprising
an analog input circuit,
an analog-to-digital converter (ADC),
a digital signal processor (DSP),
logic and control circuits,
memory coupled to the DSP and the logic and control circuits, and
a pulse width modulation (PWM) generator;
a power supply for powering the mixed signal integrated circuit device; and
a test push button, wherein when the test push button is pushed the AFCI is tested for proper operation by simulating an arc fault noise signal with the PWM generator and coupling the arc fault noise signal into the analog input circuit.

10. The AFCI according to claim 9, further comprising a light emitting diode (LED) for indicating proper operation of the AFCI.

11. The AFCI according to claim 9, wherein the memory comprises look-up tables that store threshold values.

12. The AFCI according to claim 9, wherein the DSP comprises:
digital processor logic for processing the sampled current signal to produce the low frequency current signal;
digital processor logic for processing the sampled current signal to produce the band pass frequency current signal;
root-mean-square (RMS) current value calculation logic coupled to an output of the low pass frequency filter; and
energy value calculation logic coupled to an output of the band pass frequency filter.

13. The AFCI according to claim 12, wherein the digital processor logic for processing the sampled current signal to produce the low pass and band pass current signals are accomplished with low pass and band pass digital filters.

14. The AFCI according to claim 13, wherein the low pass and band pass digital filters are finite impulse response (FIR) digital filters.

15. The AFCI according to claim 9, wherein the digital processor logic for processing the sampled current signal to produce the low pass frequency current signal is accomplished by decimation of the sampled current signal.

16. The AFCI according to claim 9, wherein the logic and control circuits comprise:
arc signature detection circuits;
trip determination logic coupled to the trip circuit; and
test routine logic coupled to the test push button.

* * * * *